(12) United States Patent
Kwon et al.

(10) Patent No.: US 6,190,056 B1
(45) Date of Patent: Feb. 20, 2001

(54) APPARATUS FOR ALIGNING OPTICAL SOURCE WITH OPTICAL FIBER AND OPTICAL SOURCE MODULE HAVING THE APPARATUS

(75) Inventors: Oh-Dal Kwon, Seoul; Seong-Eun Lim, Kuri-shi; Tae-Woo Yun, Suwon, all of (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/494,630

(22) Filed: Jan. 31, 2000

(30) Foreign Application Priority Data

Feb. 6, 1999 (KR) .................................................. 99-4098

(51) Int. Cl.[7] ...................................................... G02B 6/36
(52) U.S. Cl. ............................................... 385/91; 385/88
(58) Field of Search .................. 385/88–94; 219/121.63, 219/121.64

(56) References Cited

U.S. PATENT DOCUMENTS

| | | |
|---|---|---|
| 4,850,671 | 7/1989 | Finzel . |
| 4,854,667 | 8/1989 | Ebata et al. . |
| 4,856,866 | 8/1989 | Freeman et al. . |
| 4,915,472 | 4/1990 | Liu . |
| 5,177,807 * | 1/1993 | Avelange et al. ...................... 385/91 |
| 5,367,140 | 11/1994 | Jouaneh et al. . |
| 5,570,444 | 10/1996 | Janssen et al. . |
| 5,631,989 | 5/1997 | Koren et al. . |
| 6,053,641 * | 4/2000 | Chun ..................................... 385/93 |
| 6,056,447 * | 5/2000 | Caras ..................................... 385/92 |
| 6,106,161 * | 8/2000 | Basavanhally et al. ................ 385/88 |

* cited by examiner

Primary Examiner—Hemang Sanghavi
(74) Attorney, Agent, or Firm—Robert E. Bushnell, Esq.

(57) ABSTRACT

An apparatus for aligning an optical source with an optical fiber. In the aligning apparatus, an optical source is installed on the substrate, an optical fiber is aligned with the optical source, for receiving light from the optical source, a holder holds the optical fiber to enable the optical fiber to receive a maximum of the light emitted from the optical source, and a fixture fixes the holder. The fixture includes a base fixed on the substrate and divided into two portions spaced from each other by a distance enough to insert the holder inbetween, a support having both ends integrally connected to the base, for supporting the holder inserted therein, a pair of protrusions extended from predetermined positions of both sides of the support along the length direction of the optical fiber, and a pair of connection portions disposed at both ends of each of the protrusions, for connecting to the holder.

20 Claims, 6 Drawing Sheets

APPARATUS FOR ALIGNING OPTICAL SOURCE WITH OPTICAL FIBER AND OPTICAL SOURCE MODULE HAVING THE APPARATUS

CLAIM OF PRIORITY

This application makes reference to, incorporates the same herein, and claims all benefits accruing under 35 U.S.C. §119 from my application APPARATUS FOR ALIGNING OPTICAL SOURCE WITH OPTICAL FIBER AND OPTICAL SOURCE MODULE HAVING THE SAME filed with the Korean Industrial Property Office on Feb. 6, 1999 and there duly assigned Serial No. 4098/1999.

BACKGROUND OF THE INVENTION

1. Field of the Invention

The present invention relates generally to an apparatus for aligning an optical source with an optical fiber and an optical source module having the same.

2. Description of the Related Art

Generally, an optical source module having an optical source aligned with an optical fiber therein can be applied to any optical part which transmits/receives light. Particular examples include a pump laser diode (LD) module, a semiconductor optical amplifier module, a 2.5-Gbit transmission/reception module, and a 155-Mbit transmission/reception module, which require high optical coupling efficiency.

A conventional apparatus for aligning an optical source with an optical fiber includes a laser diode installed on a substrate, a photo diode (PD) aligned with the laser diode on the substrate, an optical fiber aligned with the laser diode, a ferrule having the optical fiber inserted thereinto, and a saddle fixing the ferrule.

The laser diode is aligned with the optical fiber in the following procedure. The laser diode is first fixed on the substrate and the optical fiber is fixed to the ferrule by soldering. The saddle is in turn fixed on the substrate. For alignment, an external driver (not shown) feeds current through the laser diode and then light is emitted from the laser diode. The displacement of the ferrule is regulated so that the optical fiber can receive a maximum of the emitted light. At a maximum light receiving position, the saddle is welded to the ferrule. Here, welding-caused deformation should be within an alignment error range. For application of the above mechanism to an optical fiber amplifier, the photodiode is provided to measure the intensity of the light emitted from the laser diode and feed back the measurement to the external driver, to thereby control the output of the laser diode.

To allow the optical fiber to obtain a high optical coupling efficiency from the laser diode, an end of the optical fiber is formed into a lens of the same shape as the far field pattern of the laser diode and aligned on multi-axes with the laser diode. In this case, the smallest alignment error range on an axis should be maintained at or below about 0.2 $\mu$m.

This conventional aligning apparatus, however, has the distinctive shortcoming of thermal expansion and contraction associated with welding. More specifically, the portion at the center of the saddle welded with the ferrule seriously incurs welding deformation to the saddle though welding the bottom of the saddle to the substrate causes no deformation.

An alignment error range along a vertical axis (y-axis) is the smallest, about 0.2 $\mu$m or less. Welding a saddle with a ferrule at welding points after alignment of an optical source with an optical fiber deforms the saddle downward as indicated by reference numeral due to welding heat. That is, thermal deformation of about 10–20 $\mu$m occurs along the y-axis, negatively influencing optical coupling efficiency. A saddle is also thermally deformed by about 5–10 $\mu$m exceeding an alignment error range, along the y-axis.

Examples of optical fiber alignment apparatus and methods of the conventional art are seen in the following U.S. Patents. U.S. Pat. No. 4,850,671, to Finzel, entitled Connector Device For Light Waveguides, describes a connector device for light waveguides having a fixing part and guide parts of various structures.

U.S. Pat. No. 4,854,677, to Ebata et al., entitled Optical Fiber Alignment And Fixing Method And Apparatus Therefor, describes a translation stage having a fixture in the form of a saddle for holding an optical fiber. The saddle has stepped portions.

U.S. Pat. No. 4,856,866, to Freeman et al., entitled Optical Fiber Connecting Means, describes an aligned plug optical fiber connector.

U.S. Pat. No. 4,915,472, to Liu, entitled Optical Fiber Terminal Plug Connectors, describes an optical fiber terminal plug connector for aligning two optical fibers.

U.S. Pat. No. 5,367,140, to Jouaneh et al., entitled Method For Laser Welding Of Optical Packages, describes an optical package having a base, a laser and a soldered optical fiber held in place by a saddle.

U.S. Pat. No. 5,631,989, to Koren et al., entitled Fiber And Active Optical Device Interconnection Assembly, describes a connector assembly for coupling an optical fiber to an active optical device.

U.S. Pat. No. 5,570,444, to Janssen et al., entitled Method Of Optically Coupling Fibers To Injection Lasers, describes an arrangement for aligning an optical fiber with an injection laser using a deformable saddle having two shoulders which support a slit rod holding the optical fiber.

However, these conventional methods and apparatus do not avoid the above-described problems associated with soldering a saddle to a substrate.

SUMMARY OF THE INVENTION

It is therefore an object of the present invention to provide an improved apparatus for aligning an optical source with an optical fiber.

It is also an object of the invention to provide an improved optical source module in which an optical fiber is aligned with an optical source.

It is a further object of the invention to provide an aligning apparatus which avoids the problems associated with thermal expansion and contraction during welding of a saddle holding the optical fiber.

The present invention achieves the above objects by providing an apparatus for aligning an optical source with an optical fiber and an optical source module having the same, wherein a saddle has a protrusion in the length direction of the optical fiber to reduce thermal deformation of the saddle in the diameter direction of the optical fiber during welding and the protrusion is welded to a ferrule to prevent heat transfer in the diameter direction of the optical fiber.

The above objects are also achieved by providing an apparatus for aligning an optical source with an optical fiber. In an aligning apparatus according to one aspect of the present invention, an optical source is installed on the substrate, an optical fiber is aligned with the optical source, for receiving light from the optical source, a holder holds the optical fiber to enable the optical fiber to receive a maximum of the light emitted from the optical source, and a fixture fixes the holder. The fixture includes a base fixed on the substrate and divided into two portions spaced from each other by a distance enough to insert the holder inbetween, a support having both ends integrally connected to the base, for supporting the holder inserted therein, a pair of protrusions extended from predetermined positions of both sides of the support along the length direction of the optical fiber, and a pair of connection portions disposed at both ends of each of the protrusions, for connecting to the holder.

According to another aspect of the present invention, an apparatus for aligning an optical source with an optical fiber has a substrate, an optical source installed on the substrate, an optical fiber aligned with the optical source, for receiving light from the optical source, a holder for holding the optical fiber to enable the optical fiber to receive a maximum of the light emitted from the optical source, and a fixture for fixing the holder. In the fixture, a base is fixed on the substrate, a pair of supports are fixed on the base and spaced from each other by a distance enough to insert the holder inbetween, a protrusion extends from each support along the length direction of the optical fiber, and a pair of connection portions are disposed at both ends of the protrusion, for connecting to the holder.

To achieve the above object, there is provided an optical source module. An embodiment of the optical source module has a box, a temperature sensor for sensing temperature inside the box, a temperature controller for controlling the temperature inside the box, and an apparatus for aligning an optical source with an optical fiber. In the aligning apparatus, an optical source is installed on the substrate, an optical fiber is aligned with the optical source, for receiving light from the optical source, a holder holds the optical fiber to enable the optical fiber to receive a maximum of the light emitted from the optical source, and a fixture fixes the holder. The fixture includes a base fixed on the substrate and divided into two portions spaced from each other by a distance enough to insert the holder inbetween, a support having both ends integrally connected to the base, for supporting the holder inserted therein, a pair of protrusions extended from predetermined positions of both sides of the support along the length direction of the optical fiber, and a pair of connection portions disposed at both ends of each of the protrusions, for connecting to the holder.

Another embodiment of the optical source module includes a box, a temperature sensor for sensing temperature inside the box, a temperature controller for controlling the temperature inside the box, and an apparatus for aligning an optical source with an optical fiber. The aligning apparatus includes has a substrate, an optical source installed on the substrate, an optical fiber aligned with the optical source, for receiving light from the optical source, a holder for holding the optical fiber to enable the optical fiber to receive a maximum of the light emitted from the optical source, and a fixture for fixing the holder. In the fixture, a base is fixed on the substrate, a pair of supports are fixed on the base and spaced from each other by a distance enough to insert the holder inbetween, a protrusion extends from each support along the length direction of the optical fiber, and a pair of connection portions are disposed at both ends of the protrusion, for connecting to the holder.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1A:
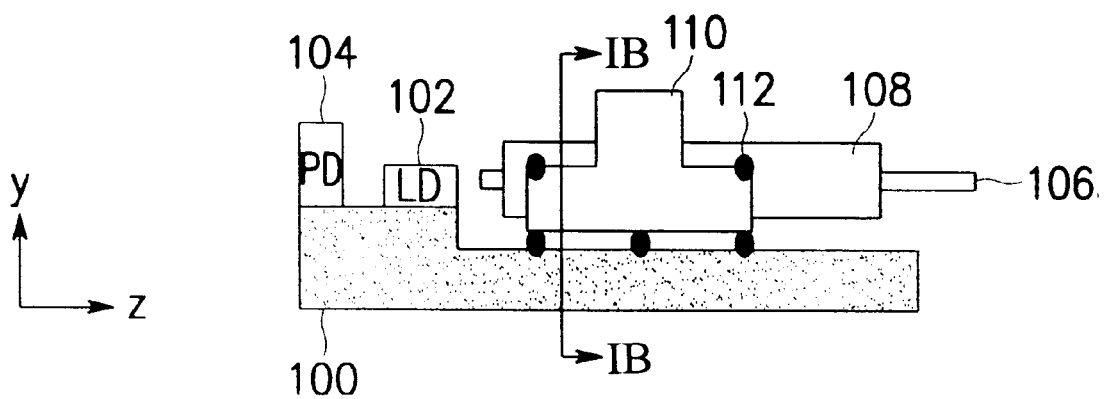
FIG. 1A is a schematic view of a conventional apparatus for aligning an optical source with an optical fiber.

Turning now to the drawings, FIG. 1A is a schematic view of the conventional apparatus discussed above for aligning an optical source with an optical fiber. In FIG. 1A, the aligning apparatus includes a laser diode 102 installed on a substrate 100, a photo diode (PD) 104 aligned with the laser diode 102 on the substrate 100, an optical fiber 106 aligned with the laser diode 102, a ferrule 108 having the optical fiber 106 inserted thereinto, and a saddle 110 fixing the ferrule 110. Reference numeral 112 denotes soldering, brazing or welding points.

Figure 1B:
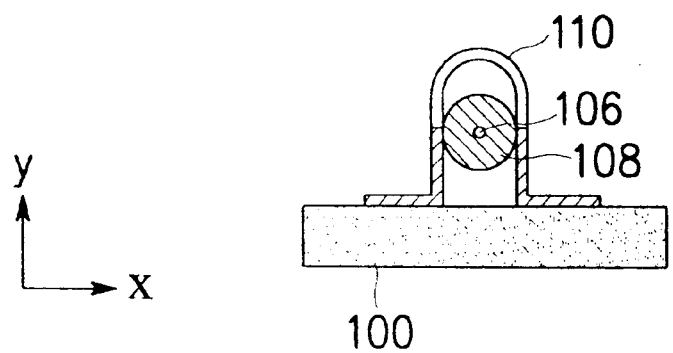
FIG. 1B is a sectional view of the conventional aligning device of FIG. 1A, taken along line 1B—1B.

FIG. 1B is a sectional view of the conventional aligning apparatus shown in FIG. 1A, taken along line 1B—1B. The laser diode 102 is aligned with the optical fiber 106 in the following procedure. The laser diode 102 is first fixed on the substrate 100 and the optical fiber 106 is fixed to the ferrule 108 by soldering. The saddle 110 is in turn fixed on the substrate 100. For alignment, an external driver (not shown) feeds current through the laser diode 102 and then light is emitted from the laser diode 102. The displacement of the ferrule 108 is regulated so that the optical fiber 106 can receive a maximum of the emitted light. At a maximum light receiving position, the saddle 110 is welded to the ferrule 108. Here, welding-caused deformation should be within an alignment error range. For application of the above mechanism to an optical fiber amplifier, the photodiode 104 is provided to measure the intensity of the light emitted from the laser diode 102 and feed back the measurement to the external driver, to thereby control the output of the laser diode 102.

To allow the optical fiber 106 to obtain a high optical coupling efficiency from the laser diode 102, an end of the optical fiber 106 is formed into a lens of the same shape as the far field pattern of the laser diode 102 and aligned on multi-axes with the laser diode 102. In this case, the smallest alignment error range on an axis should be maintained at or below about 0.2 μm.

This conventional aligning apparatus, however, has the distinctive shortcoming of thermal expansion and contraction associated with welding. More specifically, the portion at the center of the saddle 110 welded with the ferrule 108 seriously incurs welding deformation to the saddle 110 although welding the bottom of the saddle 110 to the substrate 100 causes no deformation.

Figure 2A:
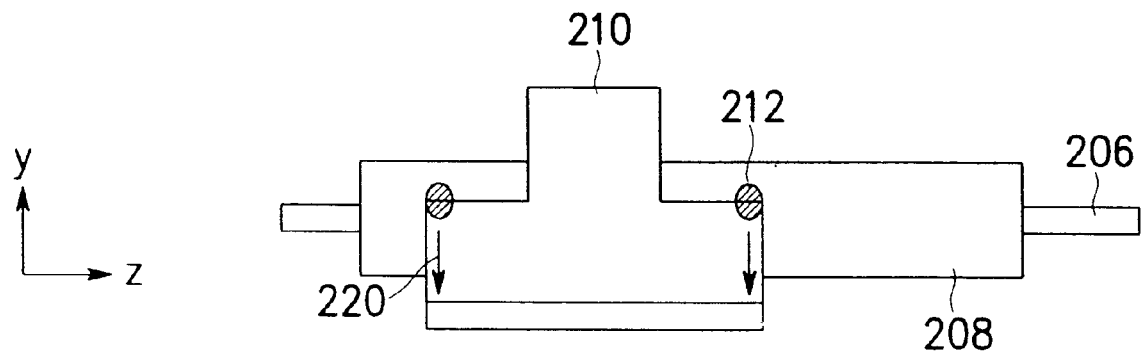
FIG. 2A is a view illustrating an example of the ferrule and the saddle shown in FIG. 1A.
Figure 2B:
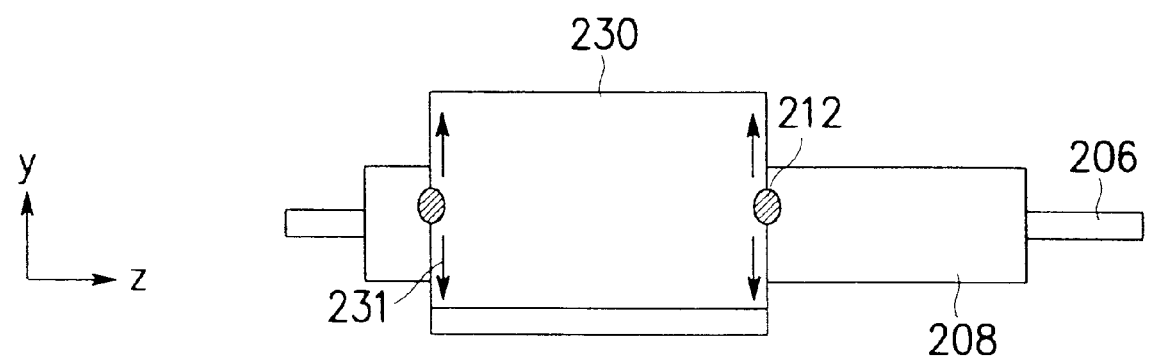
FIG. 2B is a view illustrating another example of the ferrule and the saddle shown in FIG. 1A.

FIG. 2A is a side view of an example of the ferrule and the saddle shown in FIG. 1A. As shown in FIG. 2A, an alignment error range along a vertical axis (y-axis) is the smallest, about 0.2 μm or less. Welding a saddle 210 with a ferrule 208 at welding points 212 after alignment of an optical source with an optical fiber 206 deforms the saddle 210 downward as indicated by reference numeral 220 due to welding heat. That is, thermal deformation of about 10–20 μm occurs along the y-axis, negatively influencing optical coupling efficiency. A saddle 230 constituted as shown in FIG. 2B is also thermally deformed by about 5–10 μm exceeding an alignment error range, along the y-axis as indicated by reference numeral 231.

Preferred embodiments of the present invention will be described hereinbelow with reference to the accompanying drawings. In the following description, well-known functions or constructions are not described in detail where they would obscure the invention in unnecessary detail.

Figure 3A:
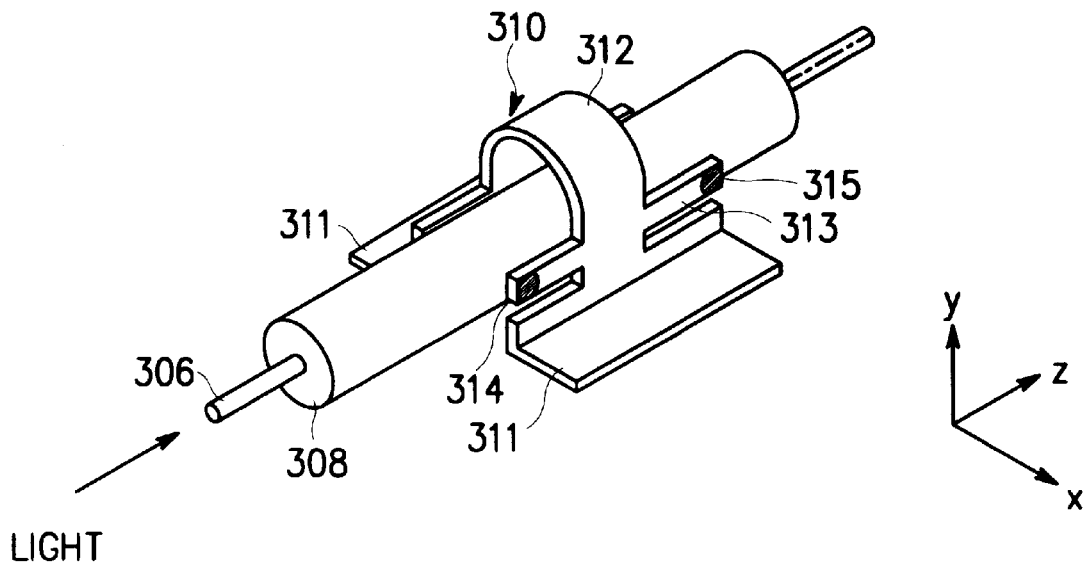
FIG. 3A is a perspective view of an apparatus for aligning an optical source with an optical fiber according to a preferred embodiment of the present invention.

FIG. 3A is a side view of an apparatus for aligning an optical source with an optical fiber according to a preferred embodiment of the present invention. The aligning apparatus of FIG. 3A includes an optical source (not shown) fixed on a substrate (not shown), a holder 308 for holding an optical fiber 306, and a fixture 310 for fixing the holder 308. A ferrule is preferably used as the holder 308. The fixture 310 is comprised of a base 311 fixed on the substrate, a support 312 for supporting the holder 308, protrusions 313, and first and second connection portions 314 and 315 connected to the holder 308. The configurations and sizes of the components in the fixture 310 are determined by their thermal deformation, processing convenience, and mechanical strength. The base 311 is divided into two portions spaced from each other by a distance enough to insert the holder inbetween and both ends of the support 312 are integrally connected to the spaced portions of the base 311.

Figure 3B:
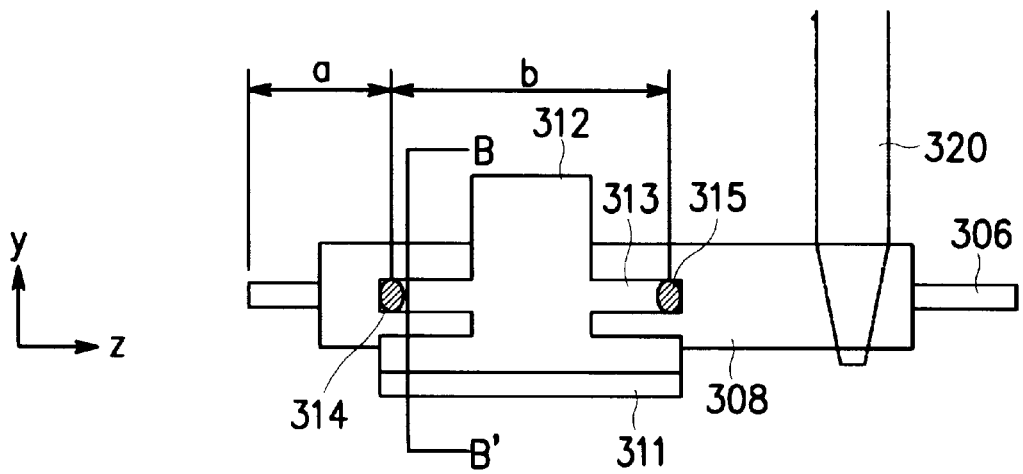
FIG. 3B is a side view of the aligning apparatus shown in FIG. 3A.
Figure 3C:
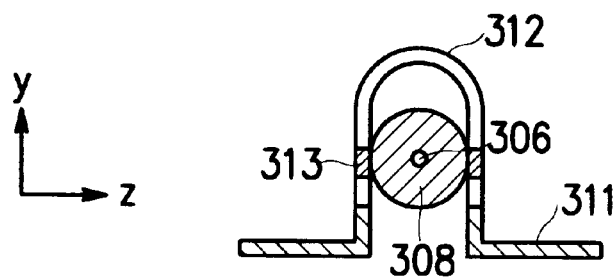
FIG. 3C is a sectional view of the apparatus of FIG. 3B taken along line IIIC—IIIC.

FIG. 3B is a side view of the aligning apparatus shown in FIG. 3A and FIG. 3C is a sectional view of the aligning apparatus shown in FIG. 3B, taken along line B-B'. Alignment of an optical source with an optical fiber in the aligning apparatus will be described referring to FIGS. 3A, 3B, and 3C. Reference numeral 320 in FIG. 3B denotes a pair of pliers or other manipulators of the holder. A laser diode (not shown) as the optical source is fixed on the substrate by soldering. The holder 308 having the optical fiber 306 inserted therein is fixed to the fixture 310 by soldering. An end of the optical fiber 306 can be processed into a lens to increase an optical coupling efficiency. One end of the holder 308 is picked up and aligned by use of the pliers 320 so that the optical fiber 306 can receive the maximum of light emitted from the LD. Then, to compensate for vibrations generated in fixing the base 311, the holder 308 is positioned again using the pliers 320 and connected to the first connection portions 314 by laser welding soldering or brazing, preferably. When connecting the holder 308 to the first connection portions 314 by laser welding soldering, thermal deformation takes place along a z axis and thermal transfer along the y axis is prevented. Then, the holder 308 is subjected to fine adjustment with the pliers 320, for realignment and connected to the second connection portions 315. Let the distance between the first connection portions 314 and the input end of the optical fiber 306 be a and the distance between the first connection portions 314 and the second connection portions 315 be b. After the second connection portions 315 are welded, the deformation of the optical fiber 306 can be reduced within an alignment error range according to an a to b ratio.

Figure 4A:
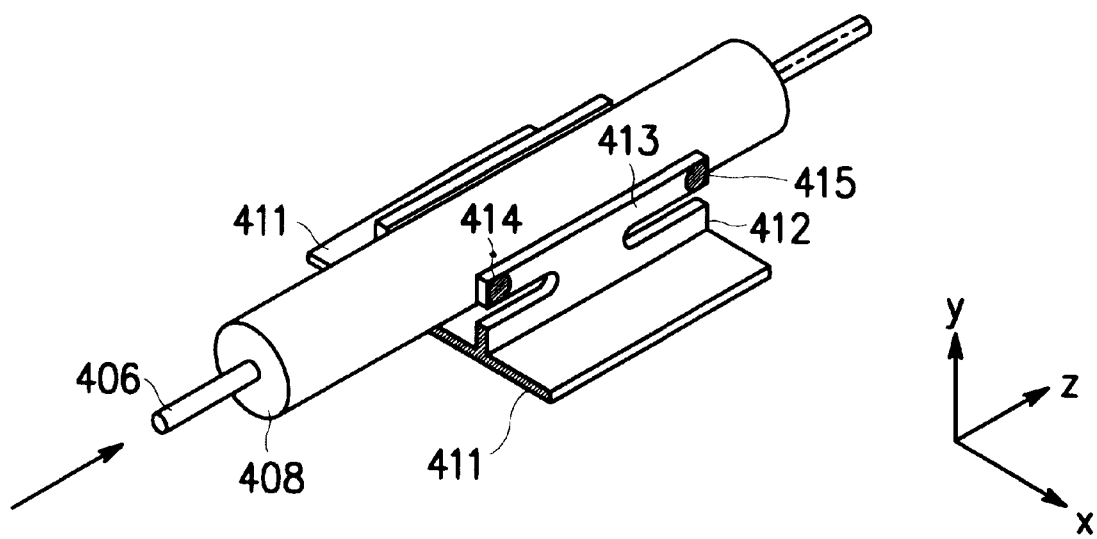
FIG. 4A is a perspective view of an apparatus for aligning an optical source with an optical fiber according to another preferred embodiment of the present invention.
Figure 4B:
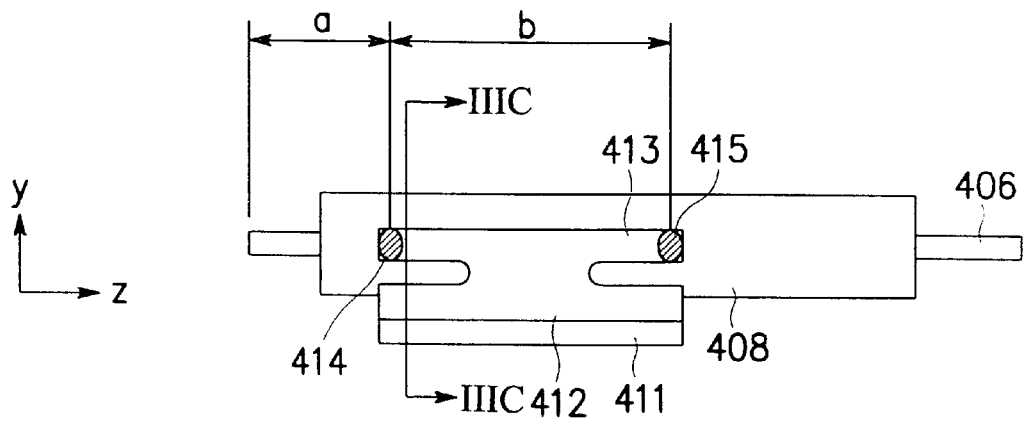
FIG. 4B is a side view of the aligning apparatus shown in FIG. 4A.
Figure 4C:
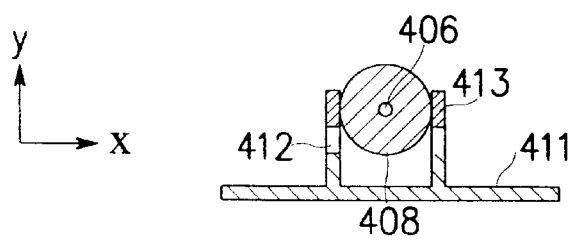
FIG. 4C is a sectional view of the aligning apparatus shown in FIG. 4B, taken along line IVC—IVC.

FIG. 4A is a perspective view of an apparatus for aligning an optical source with an optical fiber according to another preferred embodiment of the present invention, FIG. 4B is a side view of the aligning apparatus shown in FIG. 4B, and FIG. 4C is a side view of the aligning apparatus shown in FIG. 4B, taken along line C-C'. The aligning apparatus of FIG. 4A includes an optical source (not shown) fixed on a substrate (not shown), a holder 408 for holding an optical fiber 406, and a fixture for fixing the holder 408. A ferrule is preferably used as the holder 408. The fixture is comprised of a base 411 fixed on the substrate, a support 412 for supporting the holder 408, a pair of supports 412, a pair of protrusions 413, and first and second connection portions 414 and 415 connected to the holder 408. The configurations and sizes of the components in the fixture are determined by their thermal deformation, processing convenience, and mechanical strength. The base 411 has an integrated structure. The supports 412 are integrally fixed on the base 411 and spaced from each other by a distance enough to insert the holder 408 in between.

Alignment of the optical source with the optical fiber 406 in the second embodiment of the present invention is performed in the same manner as shown in FIGS. 3A, 3B, and 3C.

Figure 5A:
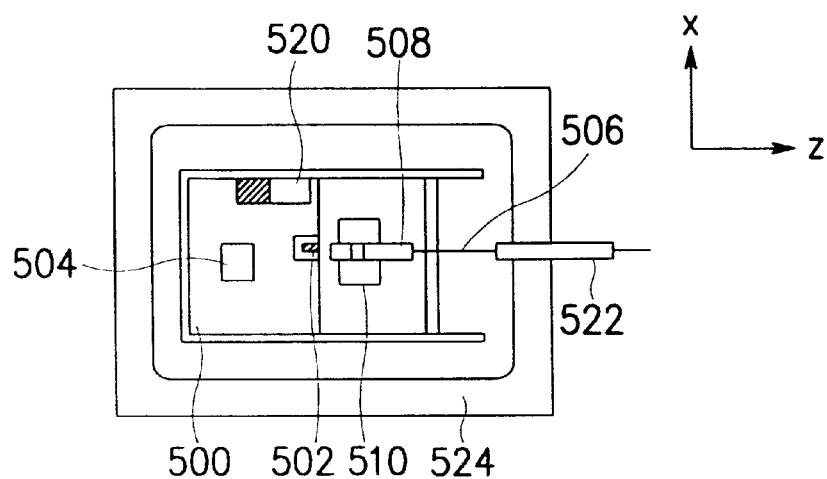
FIG. 5A is a plan view of an optical module having an aligning apparatus according to the present invention.
Figure 5B:
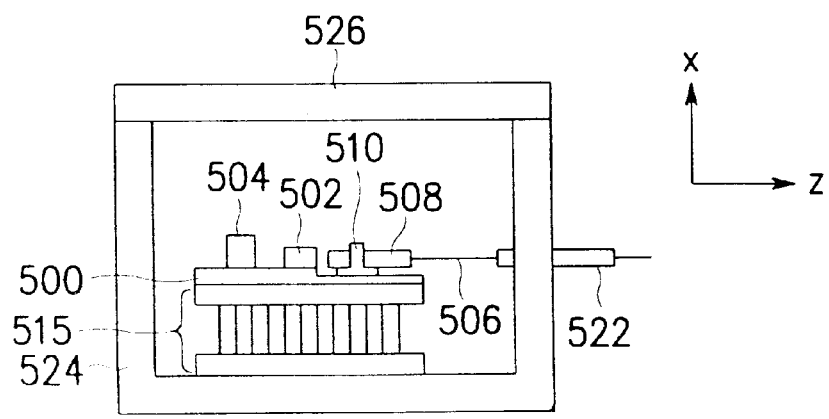
FIG. 5B is a side view of the optical source module shown in FIG. 5A.

FIG. 5A is a plan view of an optical source module having an aligning apparatus according to the present invention and FIG. 5B is a side view of the optical source module shown in FIG. 5A. Referring to FIGS. 5A and 5B, the optical source module includes an engine 500, a laser diode 502, a photodiode 504 for converting an optical signal to an electrical signal in order to measure the intensity of light emitted from the laser diode 502, an optical fiber 506 aligned with the laser diode 502, a holder 508 for fixedly holding the optical fiber 506, a fixture 510 for fixing the holder 508, a thermoelectric cooler 515 being a temperature controller and disposed under the engine 500, for maintaining temperature inside the optical source module to be constant, a thermister 520 being a temperature sensor, a box 524, a cover 526 covering the box 524, and a window ferrule 522 penetrating into the box 500, for protecting the optical fiber 506. Gases including nitrogen gas can be filled in the box 524. In the case of a 2.5-Gbit transmission/reception module or a 155-Mbit transmission/reception module, a ball lens can be further provided between the laser diode 502 and the optical fiber 506 in order to increase an alignment error range. In a semiconductor optical amplifier module, the photodiode 504 can be replaced with another optical fiber, for direct coupling.

The laser diode 502 is aligned with the optical fiber 506 in the method shown in FIGS. 3A to 4C. The thermister 520 senses the temperature inside the optical source module to minimize deformation caused by temperature change during soldering components and maintain the performance of the laser diode 502 to be stable. The thermister 520 outputs a sensed temperature to the thermoelectric cooler 515 and the thermoelectric cooler 515 controls the temperature inside the module based on the sensed temperature. To reduce temperature-incurred deformation, it is preferable to form each component of a material having a low linear expansion coefficient. The substrate 500, the fixture 510, and the ferrule 508 are preferably of the same material since they are fixed by welding. For example, the material can be nickel, KOVAR, a steel-nickel alloy, or SUS.

In the apparatus for aligning an optical source with an optical fiber and the optical source module having the aligning apparatus in accordance with the present invention, the fixture is modified in such a way to reduce thermal deformation of the fixture caused by soldering the holder to the fixture to fix the holder and thus the optical fiber can be aligned with the optical source within an allowable alignment error range. Therefore, the resulting increase of optical coupling efficiency enables fabrication of an optical source module with a higher output under the situation that an optical source with the same performance is used. Furthermore, the linear expansion of the fixture in the diameter direction of the holder is blocked, thereby increasing temperature reliability.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for aligning an optical source with an optical fiber, comprising:
    a substrate;
    an optical source installed on the substrate;
    an optical fiber aligned with the optical source, for receiving light from the optical source;
    a holder for holding the optical fiber to enable the optical fiber to receive a maximum of the light emitted from the optical source; and
    a fixture for fixing the holder, said fixture comprising:
        a base fixed on the substrate, said base divided into two portions spaced from each other by a distance enough to insert the holder inbetween;
        a support having two sides respectively connected to the two portions of the base, for supporting the holder;
        a pair of protrusions respectively extending from predetermined positions of the two sides of the support along the length direction of the optical fiber, each protrusion having two ends; and
        a pair of connection portions disposed at both ends of each of the protrusions, for connecting to the holder.

2. The apparatus of claim 1, said holder being connected to the connection portions by one of laser welding, soldering and brazing.

3. An apparatus for aligning an optical source with an optical fiber, said apparatus comprising:
    a substrate;
    an optical source installed on the substrate;
    an optical fiber aligned with the optical source, for receiving light from the optical source;
    a holder for holding the optical fiber for enabling the alignment of the optical fiber with the optical source; and
    a fixture for fixing the holder, said fixture comprising:
        a base fixed on the substrate;
        a pair of supports fixed on the base and spaced from each other by a distance enough to insert the holder inbetween;
        a protrusion extending from each support along the length direction of the optical fiber, each protrusion having two ends; and
        a pair of connection portions disposed at both ends of each protrusion, for connecting to the holder.

4. The apparatus of claim 3, said holder being connected to the connection portions by one of laser welding, soldering and brazing.

5. An optical source module comprising:
    a box;
    a temperature sensor for sensing temperature inside the box;
    a temperature controller for controlling the temperature inside the box; and
    an apparatus for aligning an optical source with an optical fiber, said aligning apparatus comprising:
        a substrate;
        an optical source installed on the substrate;
        an optical fiber aligned with the optical source, for receiving light from the optical source;
        a holder for holding the optical fiber and enabling the optical fiber to receive a maximum of the light emitted from the optical source; and
        a fixture for fixing the holder, said fixture comprising:
            a base fixed on the substrate and divided into two portions spaced from each other by a distance enough to insert the holder inbetween;
            a support having two sides integrally connected to the base, for supporting the holder inserted therein;
            a pair of protrusions extended from predetermined positions of both sides of the support along the length direction of the optical fiber;
            and a pair of connection portions disposed at both ends of each of the protrusions, for connecting to the holder.

6. An optical source module comprising:
    a box;
    a temperature sensor for sensing temperature inside the box;
    a temperature controller for controlling the temperature inside the box; and
    an apparatus for aligning an optical source with an optical fiber,
    wherein the aligning apparatus includes:
        a substrate;
        an optical source installed on the substrate
        an optical fiber aligned with the optical source, for receiving light from the optical source;
        a holder for holding the optical fiber to enable the optical fiber to receive a maximum of the light emitted from the optical source; and
        a fixture for fixing the holder, said fixture comprising:
            a base fixed on the substrate;
            a pair of supports fixed on the base and spaced from each other by a distance enough to insert the holder inbetween;
            a protrusion extending from each support along the length direction of the optical fiber, said protrusion having two ends; and
            a pair of connection portions disposed at both ends of the protrusion, for connecting to the holder.

7. An optical apparatus, comprising:

a substrate;

an optical fiber disposed above the substrate;

a holder mounted to a portion of the optical fiber, for holding the optical fiber;

a fixture for fixing the holder, said fixture comprising:
two base portions mounted on the substrate flanking the axis of the optical fiber;
two supports, each support formed integrally with one of said base portions, said supports extending away from the substrate;
two protrusions, each protrusion extending from one of said supports, each protrusion extending generally parallel to the optical fiber and having two opposite ends separated from the support from which the protrusion extends; and
connection portions connecting said ends of said protrusions to said holder.

8. The apparatus of claim 7, said holder being a ferrule mounted around the optical fiber.

9. The apparatus of claim 7, said connection portions being connected to the protrusions by laser welding, soldering or brazing.

10. The apparatus of claim 7, said substrate, support and holder being all formed of the same material.

11. The apparatus of claim 10, said substrate, support and holder being formed of a material selected from nickel, KOVAR, steel-nickel alloy and SUS.

12. The apparatus of claim 7, further comprising:
a top support connecting upper portions of the two protrusions, said top support extending above the optical fiber.

13. The apparatus of claim 12, said top support having an arched shape.

14. The apparatus of claim 7, further comprising:

a laser diode mounted on the substrate and aligned with an end of the optical fiber;

an engine for driving the laser diode;

a photodiode for measuring the light emitted by the laser diode; and a thermoelectric cooler disposed under the engine for controlling the temperature of the apparatus.

15. The apparatus of claim 14, further comprising:
a box enclosing the substrate, the fixture, the holder and the thermoelectric cooler.

16. The apparatus of claim 15, said box comprising a window ferrule for protecting the optical fiber.

17. The apparatus of claim 14, further comprising:
a ball lens mounted between the laser diode and the end of the optical fiber.

18. A method for aligning an optical fiber with a laser diode, comprising the steps of:

providing a substrate having a laser diode and having a fixture mounted thereon, said fixture comprising:
two base portions mounted on the substrate flanking the axis of a fiber to be mounted;
two supports, each support formed integrally with one of said base portions, said supports extending upward from the substrate;
two protrusions, each protrusion extending from one of said supports and terminating in two opposite ends separated from the support from which the protrusion extends, one end nearer and one end further from the laser diode;

mounting a portion of the optical fiber in a holder;

inserting the holder in between the two protrusions and aligning the optical fiber with the laser diode;

laser welding, soldering or brazing the holder to the two ends nearer the laser diode, of the two protrusions;

positioning the holder to realign the optical fiber and holder, for fine adjustment of the alignment; and laser welding, soldering or brazing the holder to the two ends further from the laser diode, of the two protrusions.

19. The method of claim 18, further comprising:
using a ferrule as the holder of the optical fiber.

20. The method of claim 18, further comprising:
selecting the holder, the fixture and the substrate to be of the same material.

* * * * *